United States Patent [19]

Strausfeld et al.

[11] Patent Number: 4,527,971
[45] Date of Patent: Jul. 9, 1985

[54] DISC RECORD STAMPER ALIGNMENT

[75] Inventors: Hermann Strausfeld, Cologne; Theo Kroenchen, Bergisch Gladbach, both of Fed. Rep. of Germany

[73] Assignee: EMI Electrola Gesellschaft mit beschrankter Haftung, Cologne, Fed. Rep. of Germany

[21] Appl. No.: 532,993

[22] Filed: Sep. 16, 1983

[30] Foreign Application Priority Data

Sep. 17, 1982 [GB] United Kingdom ............... 8226625

[51] Int. Cl.[3] .............................................. B29C 1/00
[52] U.S. Cl. .................................... 425/409; 264/107; 425/810
[58] Field of Search .............. 425/810, 406, 409, 233; 264/106, 107, 71, 91, 93, 235; 29/271, 559; 82/45; 83/699; 33/191

[56] References Cited

U.S. PATENT DOCUMENTS

| | | | |
|---|---|---|---|
| 660,486 | 10/1900 | Brown | 82/45 |
| 930,077 | 8/1909 | Knobelsdorf | 82/45 |
| 1,622,678 | 3/1927 | Schramm | 33/191 |
| 1,916,996 | 7/1933 | Somner | 425/810 |
| 4,185,955 | 1/1980 | Holmes et al. | 264/106 |

FOREIGN PATENT DOCUMENTS 1509362  5/1978  United Kingdom .

OTHER PUBLICATIONS

IBM Technical Disclosure Bulletin, vol. 12, No. 6, M. A. Wilke, Nov. 1969, pp. 837, 838.

Primary Examiner—Jay H. Woo
Assistant Examiner—J. Fortenberry
Attorney, Agent, or Firm—Fleit, Jacobson, Cohn & Price

[57] ABSTRACT

An upper press block for a disc record press comprises a support member surrounding a mould member to which a stamper plate is fixed. Means for adjusting the axis of the stamper plate relative to the support member are provided by four lever arms evenly spaced around the mould member, each lever arm being pivotally mounted to the support member and engaging the periphery of the mould member. Each lever arm is disposed between two opposing cams which may be rotated to adjust the mould block position in a lockable manner.

5 Claims, 4 Drawing Figures

DISC RECORD STAMPER ALIGNMENT

BACKGROUND OF THE INVENTION

1. Field of the Invention

This invention relates to alignment of press blocks, and more especially to alignment of stamper plates mounted on disc record press blocks.

2. Description of the Prior Art

Disc records are typically manufactured from a shot of thermoplastics material, which is inserted between a pair of opposing press blocks in a disc record press, the press blocks each having mould members to which stamper plates are fixed. Closure of the press under suitable temperature and pressure control produces a disc record bearing a positive impression of the corresponding negative impression of an information track imprinted in the stamper plate.

The advent of video disc records has required considerable improvement in quality, necessitating tighter constraint on manufacturing variables and an increased importance in the correct alignment of stamper plates with respect to the axis of rotation of a disc record manufactured therefrom, especially having regard to automatic tracking playback devices.

SUMMARY OF THE INVENTION

It is an object of this invention to provide a press block for a disc record press having an improved system for adjusting the alignment of its associated stamper plate.

According to the invention there is provided a press block for a disc record press comprising a mould member to which a stamper plate is affixed, an outer support member surrounding the periphery of said mould member, said support member supporting said mould member such that said mould member may be adjustably positioned relative to said support member, and an alignment system comprising at least three adjustment means disposed around said periphery, each adjustment means comprising a lever arm pivotally mounted to said outer support member, said lever arm having a curved surface which engages said mould member at its periphery, said lever arm having a scale marked thereupon adjacent to said curved surface, said lever arm being disposed between a pair of opposing cams, said cams being pivotably mounted to said outer support member such that said cams may be rotated to cause rotation of said lever arm, thereby enabling the adjustable displacement of said mould member relative to said support member in a lockable manner.

A preferred embodiment of the invention will now be described, by way of example, with reference to the accompanying drawings.

DESCRIPTION OF THE PREFERRED EMBODIMENT

A press suitable for production of disc records includes two vertically opposed press blocks having respective stamper plates mounted thereon. Each press block is precisely machined and manufactured to a thickness sufficient to accommodate the combination of stretching and lateral bending forces encountered during pressing.

Figure 1:
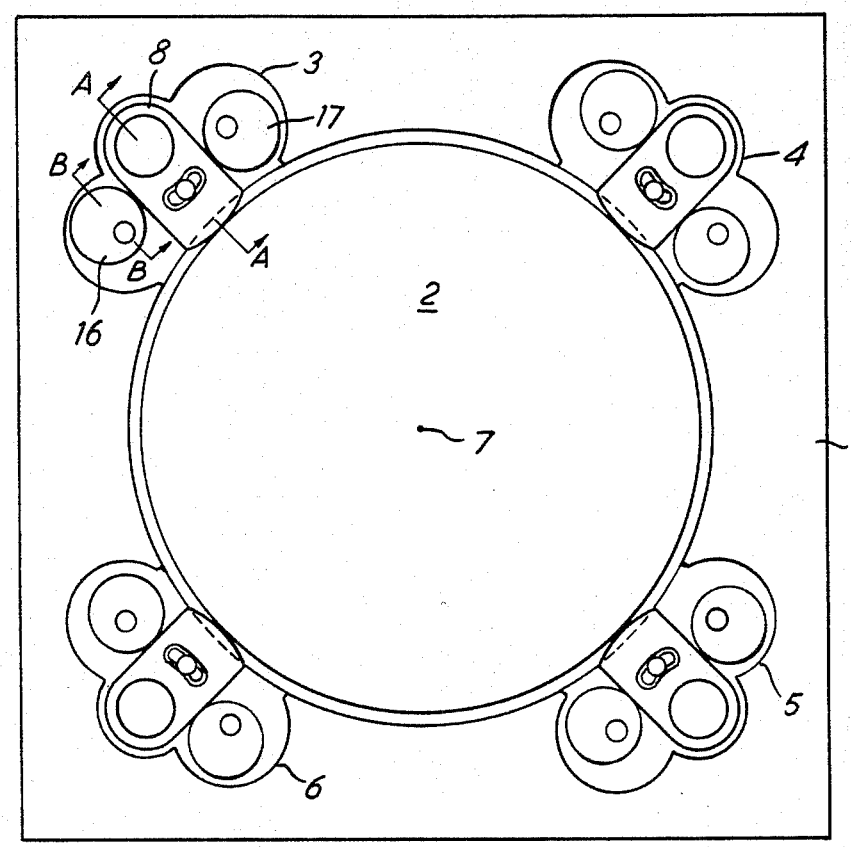
FIG. 1 illustrates an upper press block including adjustment means, viewed from above.

Referring to FIG. 1, an upper press block in a record press includes an outer support member 1 which surrounds a circular mould member 2. The mould member has a stamper plate fixed to its underside and may be composed of a number of parts assembled in heat conducting relationship, as disclosed, for example, in British Patent Specification No. 1509362. The outer support member is fixed to the record press such that, in operation, the press block upper surface is acted upon by the upper ram (not shown) of the record press. The mould member is supported in the outer support member such that the mould member may be adjustably moved relative to the support member in a horizontal plane to permit the accurate axial alignment of its associated stamper plate with a stamper plate fixed to the lower press block of the record press. The lower press block (not shown) has a central protruding pin at the axis of the lower stamper plate which defines the central hole of a pressed disc record.

The outer support member 1 of the upper press block is a square plate having a central bore hole. The upper region of the bore hole is counterbored to provide a horizontal internal ledge 20, FIG. 3. The outer cylindrical surface of the mould member has an external profile complementary to the bore hole profile such that the mould member may rest in the bore hole, the ledge 20 supporting the overhanging portion 21 of the mould member. The mould member fits loosely into the bore hole, permitting small lateral adjustments to be made to the position of the mould member relative to the support member. The mould member is comprised of three plates 22, 23 and 24 rigidly fixed together, plates 22 and 23 being assembled with recessed screws such as 25, these plates containing suitably spaced channels such as 26 for a temperature control fluid. A stamper plate (not shown) is fixed by means of a peripheral clamp (not shown) to the lower surface 19 of the mould member. The position of the axis of the stamper plate is represented by the point 7 in FIG. 1. When correctly aligned, the axes of both the upper and lower stamper plates coincide at a point corresponding to the centre of a pressed disc record.

Four adjustment means 3–6 are located evenly around the periphery of the mould member 2. It will be apparent that at least three adjusting means will be required to effect displacement of the axis 7 and that the spacing between respective adjustment means need not be identical. Alteration of each adjustment means can change the position of the mould member relative to the support member, thereby permitting fine adjustments to be made to the position of the stamper plate axis 7.

Figure 2:
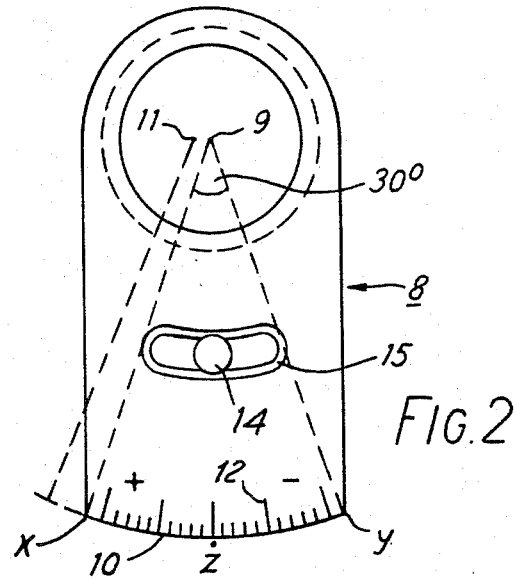
FIG. 2 illustrates a lever arm used in the adjustment means, viewed from above.
Figure 3:
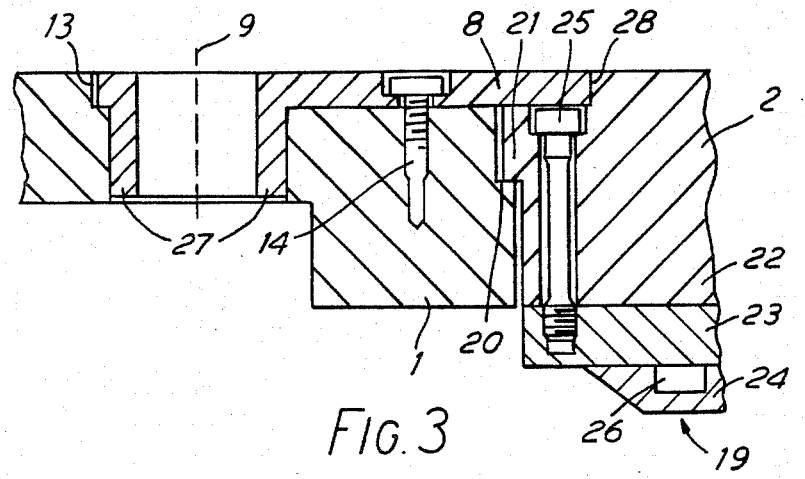
FIG. 3 illustrates a sectional view along the line A—A, of FIG. 1 through a lever arm.

Each adjustment means comprises a lever arm 8 mounted to the support member 1 about a pivot point 9 as illustrated in FIGS. 2 and 3, a tubular protrusion 27 on the lever arm having a sliding fit in a circular hole through the support member. The upper surface of the support member has a recess 13 in the vicinity of each lever arm such that the upper surfaces of the lever arm and the support member are co-planar. Each lever arm has an arcuate surface 10 which engages the periphery of the mould member. The upper surface of the mould member has a recess around its periphery such that the point of engagement is at the shoulder 28 of the recess, and the upper surfaces of the mould member is co-planar with the upper surfaces of the lever and the support member. The radius centre 11 of the arcuate surface 10 is offset from the pivot point 9 and the complete arcuate surface 10 subtends an angle of 30° at pivot point 9, although clearly other angles can be utilized. A scale 12 is marked on the surface 10, the use of which will become apparent hereinafter. The lever arm 8 is retained in the recess 13 by a guide pin 14 passing through an arcuate slot 15 in the body of the lever arm. It will be apparent that the distance between point Y and pivot point 9 is less than that between point X and pivot point 9. Consequently, clockwise rotation of lever arm 8 about point 9 effectively brings stationary point Z disposed at the arcuate surface 10 closer to pivot point 9.

Figure 4:
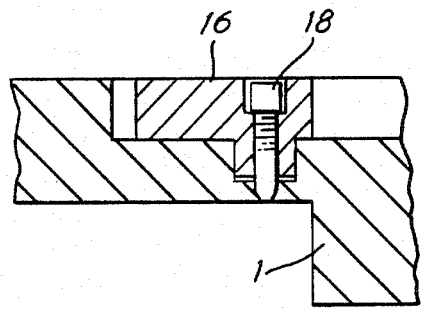
FIG. 4 illustrates a sectional view along the line B—B of FIG. 1 through a cam.

The lever arm is disposed between respective opposed eccentrically mounted cams 16 and 17, each recessed into the support member 1 and respectively pivoted about a pin 18 as illustrated in FIG. 4. The opposing cams lock the position of the lever arm 8 in addition to acting thereon to cause rotation thereof when the cam levers are themselves rotated.

Consequently each adjustment means 3–6 can be altered to engage the mould member 2 to move the axis thereof relative to the support member 1, in a manner which is accurate and self-locking as a consequence of the cams.

Axial misalignment of the upper stamper plate may be measured and corrected by first forming a test disc record within the press. When the formed test disc record is rotated on a turntable about its central hole, such misalignment results in eccentricity of a recorded groove in relation to the disc record centre, and is visually apparent at the circular discontinuity between the inner unrecorded region of the disc and the surrounding information region. The test disc is formed with one or more marks such that its angular position in relation to each of the adjusting means can be readily identified. The misalignment of the upper stamper plate at each adjusting means can be measured by rotating the test disc record and observing the radial deviations of the above mentioned discontinuity at the angular positions corresponding to each adjusting means. The adjusting means can then be appropriately corrected. A video camera and display screen may be used to present a magnified image of the discontinuity, the display screen having a scale which corresponds to the scale 12 on each lever arm, thereby enabling an operator to directly read off the adjustment required to each lever arm and to make the appropriate adjustment.

It will be apparent that other methods of measuring and correcting for axial misalignment can be utilised.

Consequently the alignment system of the invention permits accurate axial alignment between an upper and lower disc record stamper plate and can be employed in conjunction with a method allowing rapid and simple adjustment to achieve this axial alignment.

It will be understood that the embodiment illustrated shows an application of the invention in one form only for the purposes of illustration. In practice the invention may be applied to many different configurations, the detailed embodiments being straightforward to those skilled in the art.

We claim:

1. A press block for a disc record press comprising a mould member to which a stamper plate is affixed, an outer support member surrounding the periphery of said mould member, said support member supporting said mould member such that said mould member may be adjustably positioned relative to said support member, and an alignment system comprising at least three adjustment means disposed around said periphery, each adjustment means comprising a lever arm pivotally mounted to said outer support member, said lever arm having a curved surface which engages said mould member at its periphery, said lever arm having a scale marked thereupon adjacent to said curved surface, said lever arm being disposed between a pair of opposing cams, said cams being pivotably mounted to said outer support member such that said cams may be rotated to cause rotation of said lever arm, thereby enabling the adjustable displacement of said mould member relative to said support member in a lockable manner.

2. A press block according to claim 1 in which said alignment system comprises four adjustment means disposed substantially uniformly around said periphery.

3. A press block according to claim 1 in which said curved surface is an arcuate surface, said arcuate surface having a centre which is offset from the pivot point of said lever arm.

4. A press block according to claim 3 in which said arcuate surface subtends an angle of substantially 30° at said pivot point.

5. A press block according to claim 1 which is suitable for use as an upper press block and in which said support member and said mould member have recesses such that the upper surfaces of said members and of said cams and levers are substantially co-planar.

* * * * *